United States Patent [19]
Moffett et al.

[11] Patent Number: 5,656,314
[45] Date of Patent: Aug. 12, 1997

[54] HYDROXYCITRIC ACID CONCENTRATE AND FOOD PRODUCTS PREPARED THEREFROM

[76] Inventors: Scott Alexander Moffett, 12730 Mulholland Dr., Beverly Hills, Calif. 90210; Ashok Kumar Bhandari, 2/4A Kensington Road, Bangalore, India, 560042; Bhagavathula Ravindranath, 714, 7th Main Road, J. P. Nagar III phase, Bangalore, India, 560078; Karanam Balasubramanvam, 7971, 2nd Main, IIIrd Block, Thyagaraja Nagar, Bangalore, India, 560 028

[21] Appl. No.: 633,921

[22] Filed: Apr. 17, 1996

Related U.S. Application Data

[63] Continuation of Ser. No. 295,281, Aug. 24, 1994, Pat. No. 5,536,516.

[51] Int. Cl.$^6$ .................................................. A23L 2/78
[52] U.S. Cl. ........................ 426/271; 426/333; 426/549; 426/599; 426/616; 426/655
[58] Field of Search ................................ 426/271, 333, 426/549, 599, 616, 655

[56] References Cited

U.S. PATENT DOCUMENTS

| | | | |
|---|---|---|---|
| 3,764,692 | 10/1973 | Lowenstein | 424/279 |
| 4,275,234 | 6/1981 | Baniel et al. | 562/584 |
| 4,522,836 | 6/1985 | Dechow et al. | 426/271 |
| 4,643,902 | 2/1987 | Lawhon et al. | 426/271 |
| 5,536,516 | 7/1996 | Moffett et al. | 426/271 |

FOREIGN PATENT DOCUMENTS

| | | | |
|---|---|---|---|
| 0 049 429 | 4/1982 | European Pat. Off. | C07C 51/48 |
| 160753 | 8/1987 | India | A23I 1/27 |

OTHER PUBLICATIONS

Greenwood et al., "Effect of (−)-hydroxycitrate on Development of Obesity in the Zucker Obese Rat", American Physiological Society E72–E78, 1981.

Lewis et al., "(−)-Hydroxycitric Acid-The Principal Acid In The Fruits of *Garcinia Cambogia* Desr.", Phytochemistry 4:619–625, 1965.

Y. S. Lewis, "Isolation and Properties of Hydroxycitric Acid", Methods in Enzymology 13:613–619, 1967.

Panksepp et al., "(−)-Hydroxycitrate and Conditioned Aversions", Pharmacology Biochemistry & Behavior 6:683–687, 1977.

Sullivan et al., "Mechanisms of Appetite Modulation by Drugs", Fed. Proc. 44:139–144, 1985.

Sullivan et al., "Effect of (−)-Hydroxycitrate Upon the Accumulation of Lipid in the Rat: I. Lipogenesis", Lipids 9:121–128, 1973.

Sullivan et al., "Effect of (−)-Hydroxycitrate Upon the Accumulation of Lipid in the Rat: II. Appetite", Lipids 9:129–134, 1973.

Majeed, et al., "Citrin A Revolutionary, Herbal Approach to Weight Management", New Editions Publishing, 1–69, 1994.

Clouatre et al., "The Diet and Health Benefits of HCA (Hydroxycitric Acid)", A Good Health Guide pp. 1–48, Copyright 1994.

Steven Foster, "On Herbs Garcinia Cambogia", Health Foods Business p. 27, 1994.

"Citrimax Brochure", Interhealth Company 2 pages, 1994.

*Primary Examiner*—Helen Pratt
*Attorney, Agent, or Firm*—Fish & Richardson P.C.

[57] ABSTRACT

A hydroxycitric acid concentrate prepared from Garcinia rind including 23 to 54% by weight free hydroxycitric acid, 6 to 20% by weight lactone of hydroxycitric acid, 0.001 to 8% by weight citric acid, and 32 to 70% by weight water, wherein the free hydroxycitric acid, the lactone of hydroxycitric acid and the citric acid constitute 94 to 99% by weight of total solutes dissolved in the water. Also disclosed is a method of preparing such a concentrate from Garcinia rind, as well as food products containing hydroxycitric acid.

17 Claims, No Drawings

HYDROXYCITRIC ACID CONCENTRATE AND FOOD PRODUCTS PREPARED THEREFROM

This is a continuation of application Ser. No. 08/295,281, filed Aug. 24, 1994, now U.S. Pat. No. 5,536,516.

BACKGROUND OF THE INVENTION

Hydroxycitric acid, both free acid and lactone forms, is present in the fruit rind, of Garcinia species (e.g., *Garcinia cambogia, Garcinia atroviridis,* and *Garcinia indica*), which are commercially available in India.

As an inhibitor of the synthesis of fat and cholesterol, hydroxycitric acid has been shown to significantly reduce the body weight and lower lipid accumulation in rats. See, e.g., Sergio, W., Medical Hypothesis 27: 39 (1988); and Sullivan, A. C. et al., Lipids 9: 121 (1973); and Sullivan, A. C. et al., Lipids 9: 129 (1973). Hydroxycitric acid is also the only known anorectic agent found as a natural constituent of edible foods consumed by humans.

Methods for the extraction and purification of hydroxycitric acid from Garcinia rind can be found in Lewis, Y. S., Methods in Enzymology 13: 613 (1967); and Indian Patent No. 160753.

SUMMARY OF THE INVENTION

One aspect of this invention relates to a hydroxycitric acid concentrate prepared from the fruit rind of the Garcinia genus (e.g., *Garcinia cambogia, Garcinia atroviridis,* and *Garcinia indica*). The concentrate comprises 23 to 54% (preferably, 32 to 48%; and particularly preferably, 36–45%) by weight free hydroxycitric acid, 6 to 20% (preferably, 10 to 18%; and particularly preferably, 13 to 16%) by weight lactone of hydroxycitric acid, 0.001 to 8% (preferably, 0.001 to 6%; and particularly preferably, 0.001 to 3%) by weight citric acid, and 32 to 70% (preferably, 35 to 55%; and particularly preferably, 38 to 50%) by weight water, wherein the free hydroxycitric acid, the lactone of hydroxycitric acid and the citric acid constitute 94 to 99% (preferably, 96 to 99%; and particularly preferably, 98 to 99%) by weight of total solutes dissolved in the water.

Another aspect of this invention relates to a process of enriching hydroxycitric acid from Garcinia rind. The process comprises (1) obtaining a salt-free water extract of the Garcinia rind, (2) loading the extract on to an anion exchange column for adsorption of the hydroxycitric acid onto the anion exchange column, (3) eluting the hydroxycitric acid from the anion exchange column with a Group IA metal hydroxide (i.e., LiOH, NaOH, KOH, RbOH, CsOH or FrOH) for release of the hydroxycitric acid as a metal salt in a first solution, and (4) loading the first solution on to a cation exchange column for collection of the hydrox-ycitric acid as a free acid in a second solution.

The salt-free water extract used in the above process can be prepared by first extracting salted Garcinia rind and subsequently removing the salt with a water miscible organic solvent (e.g., acetone or ethyl alcohol). As to the ion exchange steps, it is preferred that the water extract be loaded at a capacity of 100 to 125% (more preferably, 105–115%) of the anion exchange column, and the first solution be loaded at a capacity of 50 to 90% (more preferably, 60–75%) of the cation exchange column. The process may further comprise, after step (4), reducing the volume of the second solution to form a concentrate and adding the concentrate to a food product (e.g., a beverage or a snack bar).

Also within the scope of this invention is a food product, such as a beverage or a snack bar, which comprises 0.17 to 23% (preferably, 0.35 to 12%) by weight free hydroxycitric acid, 0.08 to 7% (preferably, 0.15 to 4%) by weight lactone of hydroxycitric acid, and at least 0.0002% (up to a proper content, e.g., 2% by weight) by weight citric acid. Preferably, the hydroxycitric acid and its lactone are from Garcinia rind. In an embodiment, the food product further comprises 0.04 to 0.4% (preferably, 0.04 to 0.08%) by weight vitamin C and/or 0.8 to 22% by weight fiber. Note that 0.0002% by weight denotes the presence of at least a trace amount, which may not be detectable by the methods described herein.

The contents of free hydroxycitric acid, lactone of hydroxycitric acid, citric acid, and non-acid solutes can be determined by the methods described in Example 4 below or equivalents thereof.

Other features and advantages of the present invention will be apparent from the following description of the preferred embodiments, and also from the appending claims.

DESCRIPTION OF THE PREFERRED EMBODIMENTS

A preferred process of this invention for enriching hydroxycitric acid from Garcinia rind includes preparing a salt-free water extract of Garcinia rind; loading the extract on to an anion exchange resin column for adsorption of hydroxycitrate ion on the anion resin and removal of non-ionizing and nonacidic impurities in the extract, such as sugar, pectins, gum and color (which pass out unadsorbed); washing the anion column with water to ensure purity of hydroxycitrate ion; adding a sodium hydroxide solution to the anion exchange resin column for release of the hydroxycitrate ion in the form of sodium hydroxycitrate salt in a solution; converting the solution of sodium hydroxycitrate salt to free hydroxycitric acid by passing the solution through a cation exchange resin column; decoloring the hydroxycitric acid solution with activated charcoal; and, finally, concentrating the hydroxycitric acid solution to a predetermined concentration.

The salt-free water extract can be prepared from salt-free Garcinia rind by cross-current or counter-current method. It can also be prepared from salted Garcinia rind by extracting the rind with water preferably in multiple steps (by cross-current or counter-current method), treating the extract with acetone to precipitate pectin, salt and other insoluble substances, and removing acetone by evaporation. Alternatively, one can treat the water extract of salted Garcinia obtained from cross-current or counter-current method with calcium hydroxide solution to precipitate the insoluble salt of calcium hydroxycitrate, dilute the precipitate with cold water, filter it to eliminate the salt and other impurities, treat the precipitate with sulphuric acid to convert the calcium hydroxycitrate to calcium sulphate and hydroxycitric acid, and finally filter out the calcium sulphate precipitate. The salt-free water extract can optionally be prepared by passing the water extract of salted Garcinia rind obtained from cross-current or counter-current method through an anion exchange column for adsorption of the chloride ion on the column.

The salt-free water extract thus prepared is then subjected to an ion exchange purification process, i.e., anion exchange followed by cation exchange, as described above.

Preferably, the anion exchange column is loaded at a capacity of 100 to 125% (more preferably, 105–115%) and the cation exchange column is loaded at a capacity of 50 to 90% (more preferably, 60-75%). The capacity of loading (expressed as a percentage) is defined as the ratio of the acid or salt content in the solution charged to an ion exchange column to the theoretical capacity of the column to bind the acid or to exchange salt, and can be controlled by the amount of acid or salt loaded on to the column.

Take Example 2, infra, for instance. The anion exchange resin as specified by the manufacturer has a capacity of 1.5 meq/ml of resin. Thus, 500 ml of the anion resin has a theoretical capacity of:

500 ml×1.5 meq/ml×208 g/3 eq=52 g (Note that hydroxycitric acid has a molecular weight of 208 daltons and has 3 eq acid groups.)

The actual amount of acid loaded was 65 g. Thus, the capacity of loading is 65 g/52 g, or 125%.

Similarly, the loading capacity for the cation exchange resin in Example 2, infra, is calculated to be 52.7%.

The solution collected from the cation exchange column is usually further treated by charcoal and concentrated by vacuum evaporation to about 55% by weight free hydroxycitric acid. A typical hydroxycitric acid concentrate obtained by the process of this invention is an aqueous solution of hydroxycitric acid containing 55 to 56% by weight total acids, of which 98 to 99% is total hydroxycitric acid (whether in the free acid or lactone form) and 1 to 2% is mostly citric acid. The concentrate also contains trace amounts of other soluble solids.

Without further elaboration, it is believed that one skilled in the art can, based on the description herein, utilize the present invention to its fullest extent. The following specific examples are, therefore, to be construed as merely illustrative, and not limitative of the remainder of the disclosure in any way whatsoever.

The anion exchange resin used in both Examples 1 and 2 was from Ion Exchange India Ltd with the trade name of Indion 850. It was a macro porous cross-linked polystyrene matrix of 0.3 to 1.2 mm particle size and 1.5 meq/ml total exchange capacity. The cation exchange resin used in both Examples 1 and 2 was also purchased from the same manufacturer and had the trade name of Indion 225H. It was a polystyrene DVB matrix of the same particle size and 2.0 meq/ml total exchange capacity.

EXAMPLE 1

Water extraction of salted Garcinia rind by the procedure commonly referred to as counter current extraction was carried out in 3 vessels marked vessel 1 to vessel 3. For the first cycle of operation, garcinia rind of 2 to 5 mm size was added to each vessel. In each vessel, 1.25 liters of 95° C. water was used to contact the rind for one hour and then drain the liquid. In the second and subsequent cycles of operation, fresh hot water was added only to vessel 1 and fresh rind was added only to vessel 3. In the second and subsequent cycles of operation, vessels 2 and 1 received the extracted rind of vessels 3 and 2 of the previous cycle, respectively. Spent rind of vessel 1 was discarded.

In the second and subsequent cycles, the extracts from vessels 1 and 2 were further extracted in vessels 2 and 3 for the next cycle. The extract from vessel 3 was the final product. After four cycles, all extracts reached steady compositions. On the fifth cycle, for an input of 750 g garcinia rind, the product obtained was 850 ml of liquid.

The final product obtained from vessel 3 was 850 ml liquid containing 158.16 g acid along with all the salt originally present in the rind. The total soluble solids was 41%. The extraction efficiency was 95.85%. This extract was further concentrated to 60% soluble solid in vacuum evaporation, so that it could be subjected to acetone refining.

Acetone refining was carried out in a 3-liter flask fitted with a stirrer. Each step of the extraction consisted of mixing aqueous phase with acetone for 15 minutes, then settling for 15 minutes and collecting the top layer. The lower layer was subjected to second and third extractions and finally discarded. More specifically, the extraction flask was charged with 0.5 liters of aqueous extract of Garcinia rind of approximately 60% soluble solids containing 149 g of total acids. It was extracted by using one liter of pure acetone and the first extract was separated from the lower aqueous residue layer containing pectins, gums and some unextracted hydroxycitric acid. The same lower layer is subjected to second extraction using 750 ml of acetone water mixture containing 16.7% water. The top layer was removed as the second extract and the bottom layer was again subjected to a third extraction using 450 ml of acetone-water mixture containing 16.7% water. The third extract was removed and pooled with the other extracts. The volume of the total extract was 2,286 ml and contained 140.36 g of acid. Acid recovery was 84.9%. The extract was evaporated under vacuum to remove all acetone and some water.

The ion-exchange process was carried out in two PVC columns of inner diameter 10.5 cm and height 92.5 cm. A stainless-steel grid of 100 mesh was held between two flanges at the base of the column and provided a support for the resin in the column. 4.4 liters of Indion 850 and 5.5 liters of Indion 225H resins are loaded in anion exchange column and the cation exchange column, respectively. The anion column, which had a capacity of 458 g, was charged with 507 g of hydroxycitric acid, giving a loading capacity of 111%. On the other hand, the anion column, which had a capacity of 762.6 g, was charged with sodium salt made from 493 g of hydroxycitric acid, giving a loading capacity of 65%.

More specifically, 1.6 liters of acetone refined Garcinia extract was diluted to 6.4 liters (containing 507 g) of acid was passed through the anion exchange column. The anion exchange resin was then washed with water to remove color and water insoluble materials such as pectins, gums, and the like. Subsequently, 6 liters of sodium hydroxide solution containing 292 g of sodium hydroxide was passed through the anion exchange column. The alkali converted the acid held on the anion exchange column into a water soluble salt, sodium hydroxycitrate, which was liberated. The anion exchange column was subsequently washed with 5 liters of water to release any salt remaining in the bed.

The sodium hydroxycitrate solution was then passed through the cation exchange column where the salt was converted to free hydroxycitric acid. The material coming out of the cation exchange column was the final product, 11 liters containing 479 g of acid. 1 liter of water was then passed through cation exchange column to collect any acid remaining on the bed.

The recovery of acid was 479 g starting from 507 g of acid in the crude acetone extract, giving an acid recovery yield of 94.4%.

EXAMPLE 2

Garcinia rind was obtained in the salt-free state from the forest area of Sirsi District, South Karnataka. The rind had 14% moisture and 19.2% hydroxycitric acid. Extraction was carried out by three-stage batch process. More specifically, 1 kg of rind was taken in a stainless-steel vessel along with 3 liters of demineralized water and heated. After boiling for 15 minutes and settling for 15 minutes, the liquor was drained out. Similarly, in the second and third stages of extraction, the spent rind was extracted with 1.5 liters of fresh demineralized water, each boiled for 15 minutes, settled for 15 minutes and the extraction liquor was collected.

1,500 ml of the salt free extract containing 65 g of hydroxycitric acid was passed slowly through 500 ml anion exchange resin column. The impurities came off as breakthrough. The resin was washed with 2–5 column volumes of water and collected along with the breakthrough. The amount of acids present in the breakthrough was 6.53 g. In other words, 58.47 g of hydroxycitric acid was held on to 500 ml of anion exchange column. The anion resin was washed with 10 column volumes of water.

70 g of sodium hydroxide in 1,500 ml of water was then passed through the anion resin. The salt, sodium hydroxycitrate, was formed, releasing the hydroxycitrate ion from the resin. The resin was washed with 2–5 column volumes of water. The effluent from the anion exchange resin was then passed through 800 ml of cation exchange resin column. Here, $Na^+$ ion was held up by releasing $H^+$ ion from the resin to give free hydroxycitric acid, which was collected in a volume of 2,000 ml. 56.55 g of hydroxycitric acid was recovered, giving a recovery percentage of 96.6%.

EXAMPLE 3

In this example, a method for removing salt, which is different from acetone refining, was performed.

200 ml of Garcinia water extract, containing 61.4 g of organic acids, was precipitated with 33.4 g of CaOH to get calcium hydroxycitrate. The precipitate was then diluted with about 300 ml of cold water and filtered under vacuum. The wet precipitate obtained, on drying at 60° C. for 16 hours, gave 83.5 g of dry calcium hydroxycitrate. The calcium hydroxycitrate was converted to hydroxycitric acid and calcium sulphate by adding 369 ml of 2.5N sulphuric acid. Calcium sulphate precipitate was removed by centrifugation at 8000 rpm for 15 minutes.

53 g of hydroxycitric acid was present in 355 ml of supernatant and the recovery was 87.6%.

150 ml of solution containing 22.4 g of hydroxycitric acid was passed through 200 ml of anion exchange resin to saturate the column. The column was washed with demineralized water and 240 ml of 5% sodium hydroxide solution was passed through the column to get 800 ml of sodium hydroxycitrate solution. 800 ml of the above solution was passed through 400 ml of cation exchange resin. 1240 ml of solution containing 18.84 g of hydroxycitric acid was obtained. The overall recovery of 18.84 g of hydroxycitric acid from the cation exchange column indicated a yield of 90.5%.

The above solution after charcoal treatment and concentration under vacuum at 72° C. to 55% by weight of hydroxycitric acid gave a hydroxycitric acid concentrate which was stable for months.

EXAMPLE 4

The composition of an exemplary hydroxycitric acid concentrate prepared from Garcinia rind by the process of this invention is shown below:

|  | % of Total Acids | % of the Concentrate |
| --- | --- | --- |
| Free HCA ("FA") | 68.58 | 37.53 |
| Lactone of HCA ("LA") | 25.38 | 13.89 |
| Citric Acid ("CA") | 5.90 | 3.23 |
| Total | 99.86 | 54.65 |

Note that the content of total acids of the concentrate was 54.72% by weight (not shown in the table), as determined by direct titration against standard sodium hydroxide (0.1N) using phenolphthalein as the indicator. Determination of the content of total acids was required as it was used with the data of FA, LA and CA obtained by HPLC so as to acquire the composition of the concentrate.

In the above table, "HCA" is the abbreviation of hydroxyditric acid and "%" refers to "% by weight." FA, LA, and CA were determined by the following HPLC system:

C18 Supelcosil column; waters HPLC system comprising waters 510 HPLC pump, waters 484 Tunable absorbance detector and Maxima 820 Chromatography Software. Instrument conditions are given below:

Column: C18 supelcosil with a guard column
Mobile phase: 0.5% THF in 2.5 pH water; pH was adjusted by using $H_2SO_4$
Flow rate: 1.0 ml/min.
Run time: 10 min.
Injection volume: 10 ul
Detector λ: 210 nm Concentrations of the samples were maintained at 1 mg/ml.

The content of non-acid solutes (i.e., solutes other than FA, LA and CA) in a concentrate can be derived from the brix value (% by weight) and the total acid content (% by weight) as quantitated by titration and HPLC. For example, the concentrate the composition of which is shown in the above table had a Brix value of 57. Thus, its content of non-acid solutes was 2.35% by weight.

$$Brix-(FA+LA+CA)=57-54.65=2.35$$

Traditionally, brix is defined as a measure of density or concentration of sugar solutions and the brix value equals percent of weight of sucrose in the solution (at 17.5° C.). Determinations can be made with a refractometer or a hydrometer (solutions must be deaerated). See Foods and Food Production Encyclopedia, Ed. Considine, D. M. et al., p. 418 (1982), hereby incorporated by reference. In this invention, a refractometer (National Hand Held Refractometer No. A-0818) purchased from Thomas Scientific, Swedesboro, N.J. was used.

It should be pointed out that LA content increases undesirably upon gradual removal of water from the free HCA-containing solution collected from the cation ion exchange column.

EXAMPLE 5

Preparation of fiber snack bars and natural beverages from a hydroxycitric acid concentrate of this invention involves the steps of diluting the concentrate in water, adding supplements, blending, heating, and periodic agitating.

For both snack bars and beverages, it is desirable to pre-pasteurize the concentrate in a highly diluted ratio with purified water. For example, approximately 10 ml of the concentrate can be added to 12 fluid ounces. These figures vary depending upon the types of products sought, ranging from 1% to 25% for the beverage and 1%–40% for the snack bar. After the blending step, the temperature of the vessel of which the preprocessing step is taking place is heated frequently using steam as in the case of beverage manufacturing or in low heat as in the snack bars. Before heat is applied (e.g., 195° F.), materials such as nutrients, antioxidants, vitamins and minerals can be added.

In the production of the beverage, after the supplementation of the desired additives and achievement of homogeneity, the liquid is pumped via stainless-steel pipeline travelling many hundreds of yards in a bottling factory. Steam at high temperatures is applied from the outside to the pipes which in turn maintains the temperature of the liquid as it is moving. The pipes are strategically placed over the machinery that injects the liquid into bottles. This mechanism operates like a valve that is turned on and off. Simultaneously, as the liquid is being pumped, it is being agitated as the beverage is transported to the bottles.

For the fiber based dietary snack bar, the preprocessing follows the same directions as the beverage. Furthermore, the environment for the development of this product is in a industrial kitchen with the use of large cooking pots. The diluted hydroxycitric acid solution is blended with water, covered and heated, bringing it to a boil for about 15 minutes. The bubbles in the boiling process provide the agitation.

The order of added ingredients for the bar is based on their solubility in water. Once again this is done at an average temperature after the cool down phase of preprocessing pasteurization. The first ingredients added are the ones that are most easily blended into a liquid solution. After all of the ingredients of the formula have been added one step at a time, the mixture is blended for 20 to 30 minutes with an industrial Hobart blender, or in a mixing vessel. The mixture is then placed into an extruder that puts forth various sizes and shapes of snack bars onto a conveyor belt for further processing, if desired.

OTHER EMBODIMENTS

From the above description, one skilled in the art can easily ascertain the essential characteristics of the present invention, and without departing from the spirit and scope thereof, can make various changes and modifications of the invention to adapt it to various usages and conditions. Thus, other embodiments are also within the claims.

For example, the hydroxycitric acid concentrate of this invention can be formulated with ginger extract or licorice extract in a liquid concentrate form. Similarly, it can be used to make lozenges with hydroxycitric acid, herbal extracts, or a variety of nutrients and flavors.

What is claimed is:

1. A hydroxycitric acid concentrate prepared from Garcinia rind, said concentrate comprising 23 to 54% by weight free hydroxycitric acid, 6 to 20% by weight lactone of hydroxycitric acid, 0.001 to 8% by weight citric acid, and 32 to 70% by weight water, wherein said free hydroxycitric acid, said lactone of hydroxycitric acid and said citric acid constitute 94 to 99% by weight of total solutes dissolved in said water.

2. The hydroxycitric acid concentrate of claim 1 comprising 32 to 48% by weight free hydroxycitric acid, 10 to 18% by weight lactone of hydroxycitric acid, 0.001 to 6% by weight citric acid, and 35 to 55% by weight water, in which said free hydroxycitric acid, said lactone of hydroxycitric acid and said citric acid constitute 96 to 99% by weight of total solutes dissolved in said water.

3. The hydroxycitric acid concentrate of claim 2 comprising 36–45% by weight free hydroxycitric acid, 13 to 16% by weight lactone of hydroxycitric acid, 0.001 to 3% by weight citric acid, and 38 to 50% by weight water, wherein said free hydroxycitric acid, said lactone of hydroxycitric acid and said citric acid constitute 98 to 99% by weight of total solutes dissolved in said water.

4. A food product comprising 0.17 to 23% by weight free hydroxycitric acid, 0.08 to 7% by weight lactone of hydroxycitric acid, and at least 0.0002% by weight citric acid.

5. The food product of claim 4 comprising 0.35 to 12% by weight free hydroxycitric acid, 0.15 to 4% by weight lactone of hydroxycitric acid, and at least 0.0002% by weight citric acid.

6. The food product of claim 5, further comprising 0.04 to 0.4% by weight vitamin C.

7. The food product of claim 6, further comprising 0.04 to 0.08% by weight vitamin C.

8. The food product of claim 6, wherein said food product is a beverage.

9. The food product of claim 6, wherein said food product is a snack bar.

10. The food product of claim 5, further comprising 0.8 to 22% by weight fiber.

11. The food product of claim 10, wherein said food product is a beverage.

12. The food product of claim 10, wherein said food product is a snack bar.

13. The food product of claim 5, wherein said food product is a beverage.

14. The food product of claim 5, wherein said food product is a snack bar.

15. The food product of claim 4, further comprising 0.04 to 0.4% by weight vitamin C.

16. The food product of claim 15, further comprising 0.04 to 0.08% by weight vitamin C.

17. The food product of claim 4, further comprising 0.8 to 22% by weight fiber.

* * * * *